(12) United States Patent
Iwamoto et al.

(10) Patent No.: US 11,947,216 B2
(45) Date of Patent: Apr. 2, 2024

(54) BACKLIGHT APPARATUS

(71) Applicant: Sharp Display Technology Corporation, Kameyama (JP)

(72) Inventors: Kenichi Iwamoto, Kameyama (JP);
Satsuki Hagihara, Kameyama (JP);
Kazuhiko Negoro, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/205,266

(22) Filed: Jun. 2, 2023

(65) Prior Publication Data

US 2023/0393431 A1 Dec. 7, 2023

Related U.S. Application Data

(60) Provisional application No. 63/348,328, filed on Jun. 2, 2022.

(51) Int. Cl.
*G02F 1/13357* (2006.01)
*G02F 1/1335* (2006.01)

(52) U.S. Cl.
CPC .. *G02F 1/133603* (2013.01); *G02F 1/133605* (2013.01); *G02F 1/133607* (2021.01); *G02F 1/133608* (2013.01); *G02F 1/133614* (2021.01)

(58) Field of Classification Search
CPC ..... F21V 9/30; F21V 9/32; F21V 9/38; G02F 1/133614; G02F 1/133607
See application file for complete search history.

(56) References Cited

U.S. PATENT DOCUMENTS

| 2018/0039006 | A1 | 2/2018 | Gotou |
| 2018/0046031 | A1 | 2/2018 | Kamada et al. |
| 2019/0051484 | A1* | 2/2019 | Nakamura ................. H01J 1/68 |

FOREIGN PATENT DOCUMENTS

| CN | 109521601 A | * | 3/2019 |
| JP | 2017-026705 A | | 2/2017 |
| WO | 2016/143765 A1 | | 9/2016 |
| WO | 2016/158370 A1 | | 10/2016 |

* cited by examiner

*Primary Examiner* — Karabi Guharay
(74) *Attorney, Agent, or Firm* — ScienBiziP, P.C.

(57) ABSTRACT

A backlight apparatus includes a light source emitting blue light, a light guide layer, a quantum dot phosphor layer, a reflective layer, and a yellow phosphor layer. The light guide layer includes a first main surface, a second main surface, at least one light-receiving side surface, and at least one non-light-receiving side surface. The quantum dot phosphor layer is provided on the first main surface side of the light guide layer and includes a red quantum dot phosphor and a green quantum dot phosphor. The reflective layer is disposed on the second main surface side of the light guide layer. The yellow phosphor layer is provided between the second main surface and the reflective layer and in a region along the at least one non-light-receiving side surface, and includes a yellow phosphor. The quantum dot phosphor layer is in contact with the first main surface.

15 Claims, 13 Drawing Sheets

| WIDTH [mm] | AMOUNT OF FLUORESCENCE | | |
|---|---|---|---|
| | 3 | 7 | 11 |
| 10 | 5 | 5 | 5 |
| 9 | 5 | 5 | 5 |
| 8 | 5 | 5 | 5 |
| 7 | 4 | 5 | 5 |
| 6 | 3 | 5 | 5 |
| 5 | 1 | 4 | 5 |
| 4 | 0 | 3 | 5 |
| 3 | -1 | 2 | 4 |
| 2 | -5 | -1 | 2 |
| 1 | -5 | -2 | -2 |
| 0 | -5 | -5 | -5 |

| DETERMINATION CRITERIA | | |
|---|---|---|
| DETERMINATION | VISIBLE LEVEL | |
| YELLOW NOT OK | POOR | 5 |
| | MARGINAL | 4 |
| | GOOD TO MARGINAL | 3 |
| OK | GOOD | 2 |
| | EXCELLENT TO GOOD | 1 |
| | EXCELLENT | 0 |
| | EXCELLENT TO GOOD | -1 |
| | GOOD | -2 |
| BLUE NOT OK | GOOD TO MARGINAL | -3 |
| | MARGINAL | -4 |
| | POOR | -5 |

FIG. 10

BACKLIGHT APPARATUS

CROSS-REFERENCE TO RELATED APPLICATIONS

This application claims the benefit of priority to U.S. Provisional Application No. 63/348,328 filed on Jun. 2, 2022. The entire contents of the above-identified application are hereby incorporated by reference.

BACKGROUND

Technical Field

The disclosure relates to a backlight apparatus.

Many liquid crystal display devices are provided with a backlight apparatus including an LED. As a backlight apparatus provided in a liquid crystal display device, a white LED device in which a blue LED and a phosphor are combined is used. For example, a remote phosphor type white LED device, in which a blue LED that emits blue light is combined with a green phosphor and a red phosphor, is used. Specifically, the blue light emitted from the blue LED toward a light guide plate and incident on the light guide plate propagates through the light guide plate, and the blue light emitted from a light emitting surface of the light guide plate is incident on a wavelength conversion layer containing the green phosphor and the red phosphor. Such white LED devices include an edge light type LED device in which the blue light is emitted from the blue LED toward a side surface of the light guide plate, and a direct type LED device in which the blue light is emitted from the blue LED toward a main surface of the light guide plate on the side opposite to the light emitting surface. JP 2017-26705 A, WO 2016/158370, and WO 2016/143765 disclose edge light type remote phosphor backlight apparatuses that use a blue LED, a green quantum dot phosphor, and a red quantum dot phosphor.

As described in JP 2017-26705 A, WO 2016/158370, and WO 2016/143765, in a display device using the edge light type remote phosphor backlight apparatus that uses the blue LED, the green phosphor, and the red phosphor, color unevenness may occur in which an outer peripheral portion of a display region looks more blue than other portions. In order to suppress the occurrence of such color unevenness, in the backlight apparatus described in JP 2017-26705 A, a colored layer exhibiting yellow (that is, a complementary color of the color of light emitted from the blue LED) is provided at an outer edge portion of a wavelength conversion layer (light conversion layer) or of a reflective sheet. The colored layer contains a yellow pigment or dye. The backlight apparatus described in WO 2016/158370 includes a coloring member exhibiting yellow and being provided on an outer peripheral portion of a wavelength conversion layer (wavelength conversion member) so as to cover a side surface of the wavelength conversion layer. The coloring member contains a yellow pigment or dye. The backlight apparatus described in WO 2016/143765 includes, on a side surface (non-light-incident end surface) that does not receive light emitted from a light source (blue LED), among side surfaces of a light guide plate, a phosphor layer (end surface wavelength conversion sheet) containing a phosphor (a yellow phosphor, for example) that emits fluorescence upon receiving blue light emitted from the blue LED.

SUMMARY

According to investigations conducted by the present inventors, when the backlight apparatuses disclosed in JP 2017-26705 A, WO 2016/158370, and WO 2016/143765 are used, a problem in which a deterioration in display quality of the display device cannot be sufficiently suppressed and/or a problem in which the display device cannot be made sufficiently thin may occur. Details will be described below.

The disclosure has been contrived to solve the above-described problems, and an object of the disclosure is to provide a backlight apparatus capable of improving performance, including display quality and/or a reduction in thickness, of a display device.

According to embodiments of the disclosure, solutions described in the following items are provided.

Item 1

A backlight apparatus including
a light source configured to emit blue light,
a light guide layer including a first main surface, a second main surface on a side opposite to the first main surface, at least one light-receiving side surface intersecting the first and second main surfaces and receiving the blue light emitted from the light source, and at least one non-light-receiving side surface intersecting the first and second main surfaces and not receiving the blue light,
a quantum dot phosphor layer provided on the first main surface side of the light guide layer, the quantum dot phosphor layer including a red quantum dot phosphor receiving the blue light and emitting red light and a green quantum dot phosphor receiving the blue light and emitting green light,
a reflective layer disposed on the second main surface side of the light guide layer, and
a yellow phosphor layer provided between the second main surface of the light guide layer and the reflective layer and in a region along the at least one non-light-receiving side surface when viewed from a normal direction of the first main surface, the yellow phosphor layer including a yellow phosphor receiving the blue light and emitting yellow light,
in which the quantum dot phosphor layer is in contact with the first main surface of the light guide layer.

Item 2

In the backlight apparatus according to Item 1, when the yellow phosphor layer is viewed from the normal direction of the first main surface, a width of the region is equal to or less than 5 mm.

Item 3

In the backlight apparatus according to Item 1 or 2, the yellow phosphor layer is in contact with a main surface of the reflective layer on the light guide layer side.

Item 4

In the backlight apparatus according to any one of Items 1 to 3, a gap is formed between the yellow phosphor layer and the second main surface of the light guide layer.

Item 5

A backlight apparatus including
a light source configured to emit blue light,
a light guide layer including a first main surface, a second main surface on a side opposite to the first main surface, at least one light-receiving side surface intersecting the first and second main surfaces and receiving the blue light emitted from the light source, and at least one non-light-receiving side surface intersecting the first and second main surfaces and not receiving the blue light,
a quantum dot phosphor layer provided on the first main surface side of the light guide layer, the quantum dot phosphor layer including a third main surface facing the first main surface, a fourth main surface on a side opposite to the third main surface, at least one first side surface substantially parallel to the at least one light-receiving side surface, and at least one second side surface substantially parallel to the at least one non-light-receiving side surface, and the quantum dot phosphor layer including a red quantum dot phosphor receiving the blue light and emitting red light and a green quantum dot phosphor receiving the blue light and emitting green light, a reflective layer disposed on the second main surface side of the light guide layer, and a yellow phosphor layer provided facing the at least one second side surface of the quantum dot phosphor layer, the yellow phosphor layer including a yellow phosphor receiving the blue light and emitting yellow light.

Item 6

In the backlight apparatus according to Item 5, the yellow phosphor layer is in contact with the at least one second side surface of the quantum dot phosphor layer.

Item 7

The backlight apparatus according to Item 5 or 6, further including an optical sheet provided on a side opposite to the light guide layer with respect to the quantum dot phosphor layer, in which the optical sheet includes a fifth main surface on the quantum dot phosphor layer side, a sixth main surface on a side opposite to the fifth main surface, at least one third side surface substantially parallel to the at least one light-receiving side surface, and at least one fourth side surface substantially parallel to the at least one non-light-receiving side surface, and the yellow phosphor layer is provided facing the at least one second side surface of the quantum dot phosphor layer and the at least one fourth side surface of the optical sheet.

Item 8

In the backlight apparatus according to Item 7, the yellow phosphor layer is in contact with the at least one second side surface of the quantum dot phosphor layer and the at least one fourth side surface of the optical sheet.

Item 9

The backlight apparatus according to Item 7 or 8, further including an other optical sheet provided on a side opposite to the quantum dot phosphor layer with respect to the optical sheet, in which the other optical sheet includes a seventh main surface on the optical sheet side, an eighth main surface on a side opposite to the seventh main surface, at least one fifth side surface substantially parallel to the at least one light-receiving side surface, and at least one sixth side surface substantially parallel to the at least one non-light-receiving side surface, and the yellow phosphor layer is provided facing the at least one second side surface of the quantum dot phosphor layer, the at least one fourth side surface of the optical sheet, and the at least one sixth side surface of the other optical sheet.

Item 10

In the backlight apparatus according to Item 9, the yellow phosphor layer is in contact with the at least one second side surface of the quantum dot phosphor layer, the at least one fourth side surface of the optical sheet, and the at least one sixth side surface of the other optical sheet.

Item 11

In the backlight apparatus according to Item 9 or 10, the optical sheet and the other optical sheet are prism sheets arranged in a manner such that respective ridge lines are orthogonal to each other.

Item 12

In the backlight apparatus according to any one of Items 5 to 11, the third main surface of the quantum dot phosphor layer is in contact with the first main surface of the light guide layer.

Item 13

A backlight apparatus including a light source configured to emit blue light, a light guide layer including a first main surface, a second main surface on a side opposite to the first main surface, at least one light-receiving side surface intersecting the first and second main surfaces and receiving the blue light emitted from the light source, and at least one non-light-receiving side surface intersecting the first and second main surfaces and not receiving the blue light, a quantum dot phosphor layer provided on the first main surface side of the light guide layer, the quantum dot phosphor layer including a third main surface facing the first main surface, a fourth main surface on a side opposite to the third main surface, and a side surface intersecting the third and fourth main surfaces, and the quantum dot phosphor layer including a red quantum dot phosphor receiving the blue light and emitting red light and a green quantum dot phosphor receiving the blue light and emitting green light, a reflective layer disposed on the second main surface side of the light guide layer, and a yellow phosphor layer provided facing the at least one non-light-receiving side surface of the light guide layer, the yellow phosphor layer including a yellow phosphor receiving the blue light and emitting yellow light, in which the third main surface of the quantum dot phosphor layer is in contact with the first main surface of the light guide layer.

Item 14

The backlight apparatus according to Item 13, further including a plastic frame surrounding the light guide layer, in which the plastic frame includes a first facing portion facing the at least one non-light-receiving side surface of the light guide layer, and the yellow phosphor layer is provided on the first facing portion.

Item 15

In the backlight apparatus according to Item 13 or 14, a gap is formed between the yellow phosphor layer and the at least one non-light-receiving side surface of the light guide layer.

According to an embodiment of the disclosure, a backlight apparatus is provided that is capable of improving performance, including display quality and/or a reduction in thickness, of a display device.

BRIEF DESCRIPTION OF DRAWINGS

The disclosure will be described with reference to the accompanying drawings, wherein like numbers reference like elements.

FIG. 10 is a diagram showing results of a color unevenness evaluation of a sample panel A.

DESCRIPTION OF EMBODIMENTS

Hereinafter, embodiments of the disclosure will be described with reference to the accompanying drawings. Note that the disclosure is not limited to the embodiments to be described below. In the following drawings, constituent elements having substantially the same functions may be denoted by common reference signs, and description thereof may be omitted.

First Embodiment

Figure 1A:
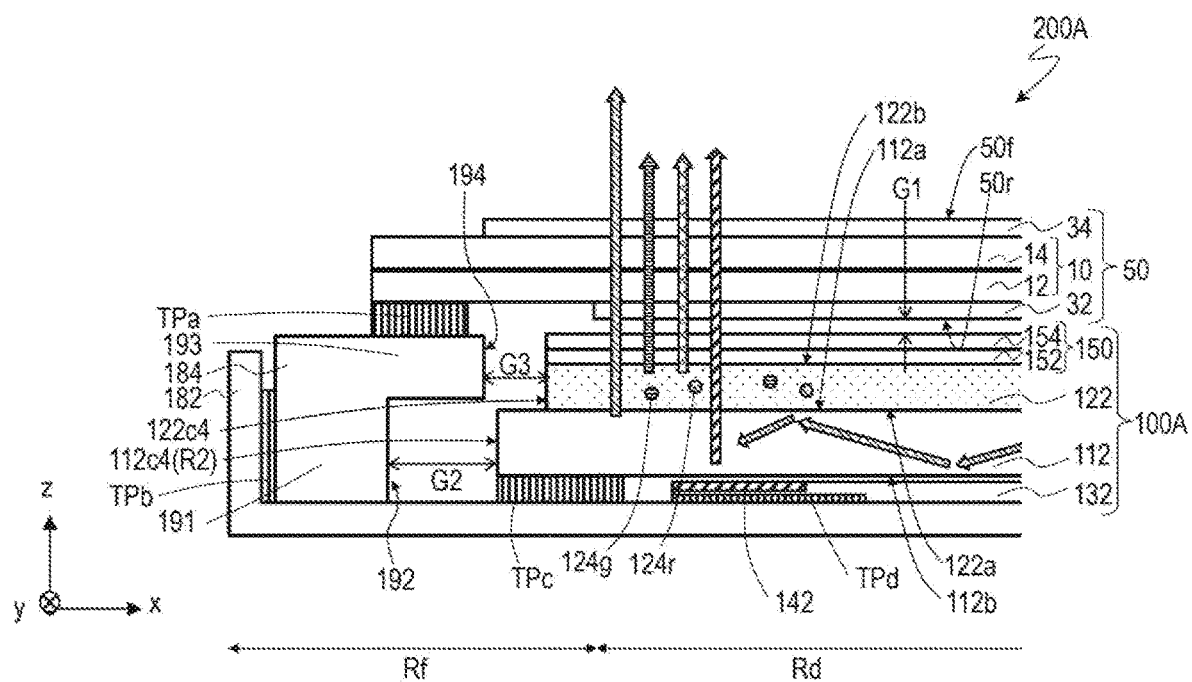
FIG. 1A is a schematic cross-sectional view of a liquid crystal display device 200A provided with a backlight apparatus 100A according to a first embodiment of the disclosure.
Figure 1B:
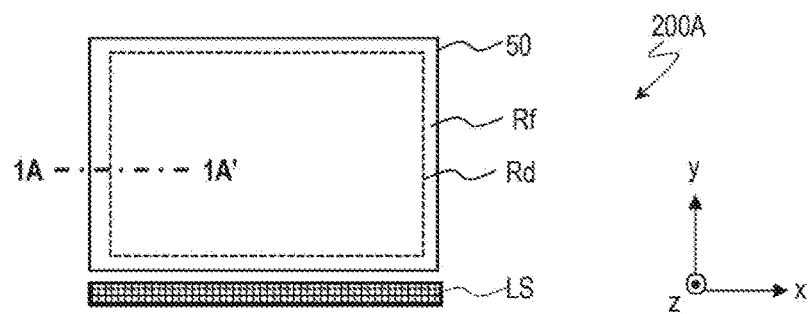
FIG. 1B is a schematic plan view of the liquid crystal display device 200A.
Figure 2A:
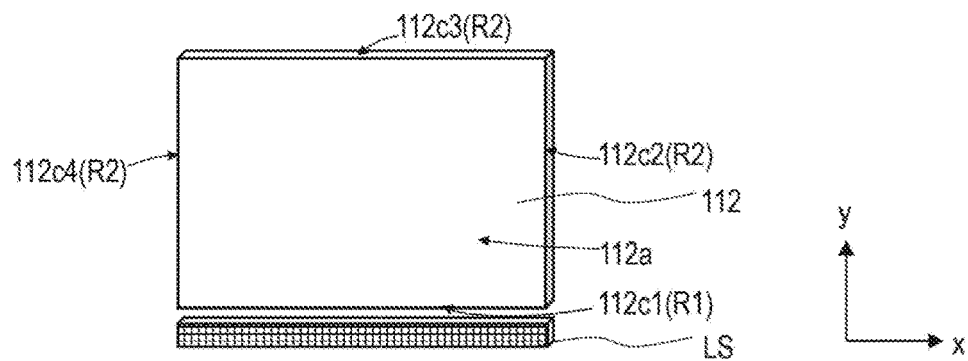
FIG. 2A is a schematic perspective view of a light guide layer 112 included in the backlight apparatus 100A.
Figure 2B:
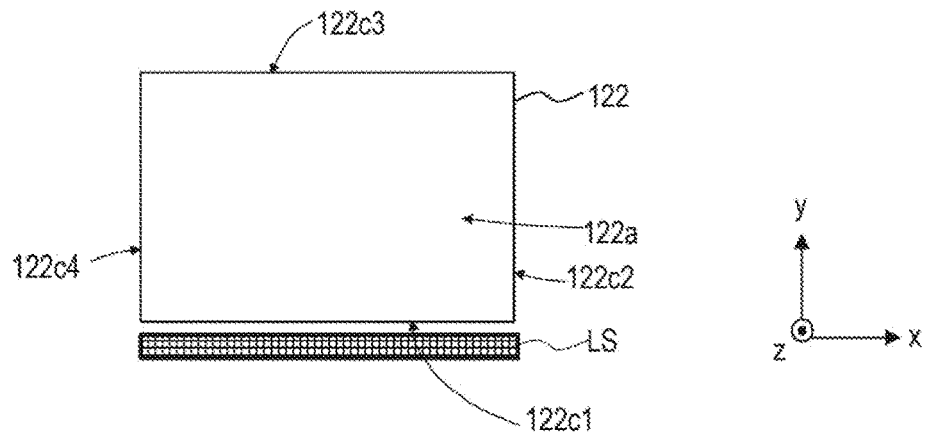
FIG. 2B is a schematic plan view illustrating a quantum dot phosphor layer 122 included in the backlight apparatus 100A.
Figure 2C:
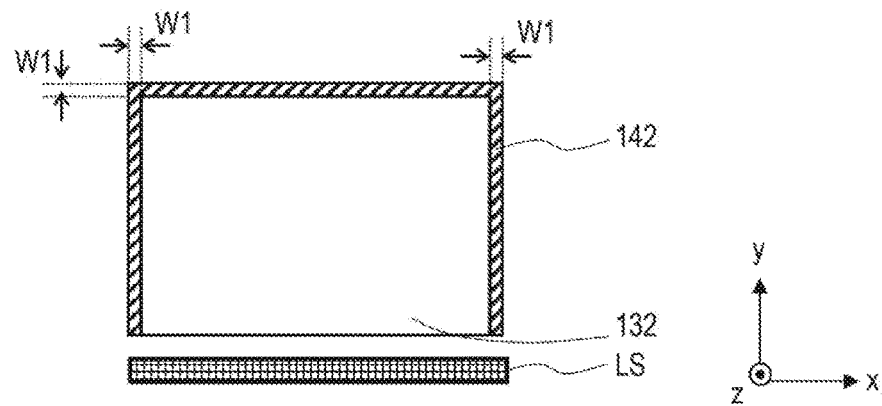
FIG. 2C is a schematic plan view illustrating a reflective layer 132 and a yellow phosphor layer 142 included in the backlight apparatus 100A.

FIG. 1A is a schematic cross-sectional view of a liquid crystal display device 200A provided with a backlight apparatus 100A according to an embodiment of the disclosure, and FIG. 1B is a schematic plan view of the liquid crystal display device 200A. FIG. 1A illustrates a cross section taken along a line 1A-1A' in FIG. 1B. FIG. 2A is a schematic perspective view of a light guide layer 112 included in the backlight apparatus 100A, and FIG. 2B is a schematic plan view illustrating a quantum dot phosphor layer 122 included in the backlight apparatus 100A. FIG. 2C is a schematic plan view illustrating a reflective layer 132 and a yellow phosphor layer 142 included in the backlight apparatus 100A. A light source LS is also illustrated in FIG. 2A, FIG. 2B and FIG. 2C.

As illustrated in FIG. 1A, the liquid crystal display device 200A is provided with a liquid crystal display panel 50 and the backlight apparatus 100A that emits white light toward a back face 50r of the liquid crystal display panel 50. The back face 50r of the liquid crystal display panel 50 is a surface on the side opposite to a front face 50f on a viewer side of the liquid crystal display panel 50.

The liquid crystal display panel 50 includes a liquid crystal cell 10, and polarizers 32 and 34 provided on both sides of the liquid crystal cell 10. The liquid crystal cell 10 includes a TFT substrate 12, a counter substrate 14 facing the TFT substrate 12, and a liquid crystal layer disposed between the TFT substrate 12 and the counter substrate 14. The liquid crystal display panel 50 includes a display region Rd (a region surrounded by a dashed line in FIG. 1B) that performs display, and a peripheral region Rf surrounding the display region Rd. The display region Rd is defined by a plurality of pixels included in the liquid crystal display panel 50. A thin film transistor (TFT) and a pixel electrode are provided at each of the plurality of pixels. The TFT substrate 12 includes the TFTs and the pixel electrodes included at each of the plurality of pixels, and a substrate (a glass substrate, for example) that supports the TFTs and the pixel electrodes. The counter substrate 14 includes a substrate (for example, a glass substrate) and a color filter layer supported by the substrate. The color filter layer includes a black matrix (light blocking layer) in the peripheral region Rf. Although a detailed description of the structure of the liquid crystal display panel 50 is omitted, the liquid crystal display panel 50 may be a known liquid crystal display panel. The regions of the liquid crystal display panel 50 corresponding to the display region Rd and the peripheral region Rf may also be respectively referred to as the display region Rd and the peripheral region Rf for the liquid crystal display device 200A as a whole.

The backlight apparatus 100A includes the light source LS that emits blue light, the light guide layer 112, the quantum dot phosphor layer 122, the reflective layer 132, and the yellow phosphor layer 142.

The light guide layer 112 includes a first main surface 112a, a second main surface 112b on the side opposite to the first main surface 112a, and side surfaces 112c1 to 112c4 intersecting the first main surface 112a and the second main surface 112b. The side surfaces 112c1 to 112c4 are located between the first main surface 112a and the second main surface 112b which are substantially parallel to each other. In this example, the first main surface 112a and the second main surface 112b have a rectangular shape, and the side surfaces 112c include the four side surfaces 112c1, 112c2, 112c3, and 112c4 (which may be collectively referred to as the side surfaces 112c). Among the four side surfaces 112c1 to 112c4 of the light guide layer 112, the side surface 112c1 that receives the blue light emitted from the light source LS is referred to as the light-receiving side surface 112c1, and the side surfaces 112c2 to 112c4 that do not receive the blue light from the light source LS are referred to as the nonlight-receiving side surfaces $112c2$ to $112c4$. The blue light emitted from the light source LS is not substantially incident on the non-light-receiving side surfaces $112c2$ to $112c4$. The non-light-receiving side surfaces $112c2$ to $112c4$ do not directly receive the blue light emitted from the light source LS, but may indirectly receive the blue light emitted from the light source LS (for example, after being incident on the light guide layer 112). R1 may be attached in parentheses to the reference sign of the light-receiving side surface, and R2 may be attached in parentheses to the reference sign of the non-light-receiving side surface (see FIG. 1A, FIG. 1B, and FIG. 2A). The light source LS emits the blue light toward the light-receiving side surface $112c1$ that includes one of the long sides (sides extending in an x direction) of the rectangle. The light source LS is disposed, for example, to face the light-receiving side surface $112c1$. Here, the first main surface $112a$ and the second main surface $112b$ are surfaces parallel to an xy plane, the side surfaces $112c1$ and $112c3$ are surfaces parallel to an xz plane, and the side surfaces $112c2$ and $112c4$ are surfaces parallel to a yz plane. The light source LS is a blue LED device, for example, and may include a plurality of blue LED chips.

The quantum dot phosphor layer 122 is provided on the first main surface $112a$ side of the light guide layer 112. The first main surface $112a$ of the light guide layer 112 is, for example, a light emitting surface of the light guide layer 112. The quantum dot phosphor layer 122 includes a red quantum dot phosphor $124r$ that receives the blue light emitted from the light source LS and emits red light, and a green quantum dot phosphor $124g$ that receives the blue light emitted from the light source LS and emits green light. In the present specification, the term "phosphor" includes a phosphor in a narrow sense, and a phosphorescent body. The light emitted by the phosphor may be referred to as "fluorescence". The term "fluorescence" includes fluorescence in a narrow sense, and phosphorescence. The quantum dot phosphor layer 122 includes a third main surface $122a$, a fourth main surface $122b$ on the side opposite to the third main surface $122a$, and four side surfaces $122c1$, $122c2$, $122c3$, and $122c4$ intersecting the third main surface $122a$ and the fourth main surface $122b$. The third main surface $122a$ of the quantum dot phosphor layer 122 is in contact with the first main surface $112a$ of the light guide layer 112. That is, no gap is formed between the third main surface $122a$ of the quantum dot phosphor layer 122 and the first main surface $112a$ of the light guide layer 112. The quantum dot phosphor layer 122 may be bonded to the first main surface $112a$ of the light guide layer 112 via an adhesive layer, for example, or may be placed on the first main surface $112a$ of the light guide layer 112. The third main surface $122a$ and the fourth main surface $122b$ of the quantum dot phosphor layer 122 have, for example, the same shape (the rectangular shape in this example) as the first main surface $112a$ and the second main surface $112b$ of the light guide layer 112.

The reflective layer 132 is disposed on the second main surface $112b$ side of the light guide layer 112. The reflective layer 132 has light reflectivity. The reflective layer 132 exhibits white. In this example, as illustrated in FIG. 2C, the main surface of the reflective layer 132 has the same shape (in this example, the rectangular shape) as the first main surface $112a$ and the second main surface $112b$ of the light guide layer 112.

The yellow phosphor layer 142 includes a yellow phosphor that receives the blue light emitted from the light source LS and emits yellow light. As the yellow phosphor, for example, $(Y,Gd)_3(Al,Ga)_5O_{12}:Ce^{3+}$ (commonly known as YAG:$Ce^{3+}$, $\alpha$-SiAlON:$Eu^{2+}$, $(Ca,Sr,Ba)_3SiO_4:Eu^{2+}$, or the like can be used. The yellow phosphor layer 142 is provided between the second main surface $112b$ of the light guide layer 112 and the reflective layer 132 and in a region along the non-light-receiving side surfaces $112c2$, $112c3$, and $112c4$ when viewed from the normal direction of the first main surface $112a$ or the second main surface $112b$. In the example illustrated in FIG. 2C, the yellow phosphor layer 142 is provided on the main surface of the reflective layer 132 on the light guide layer 112 side, in a region having a width W1 along three sides, excluding the long side on which the light source LS is disposed, of the outer periphery (that is, the four sides of the rectangle) of the main surface. The width W1 indicates a width in a direction on the xy plane orthogonal to a direction along each of the three sides except the long side on which the light source LS is disposed. Although a gap is formed between the yellow phosphor layer 142 and the second main surface $112b$ of the light guide layer 112 in the illustrated example, the yellow phosphor layer 142 and the second main surface $112b$ of the light guide layer 112 may be in contact with each other. The yellow phosphor layer 142 may be provided on the second main surface $112b$ of the light guide layer 112.

The backlight apparatus 100A further includes a plastic frame 184 that holds the light guide layer 112, the quantum dot phosphor layer 122, and the reflective layer 132, and a holder 182 that holds the plastic frame 184 from the back face side. The plastic frame 184 is provided so as to surround the side surfaces $112c1$ to $112c4$ of the light guide layer 112 and the side surfaces $122c1$ to $122c4$ of the quantum dot phosphor layer 122. In this example, the plastic frame 184 includes a first surrounding portion 191 that surrounds the side surfaces $112c1$ to $112c4$ of the light guide layer 112, and a second surrounding portion 193 that surrounds the side surfaces $122c1$ to $122c4$ of the quantum dot phosphor layer 122. The first surrounding portion 191 includes a first facing portion 192 facing the non-light-receiving side surfaces $112c2$ to $112c4$ of the light guide layer 112. The second surrounding portion 193 includes a second facing portion 194 facing the side surfaces $122c2$ to $122c4$ of the quantum dot phosphor layer 122. A gap is formed between the plastic frame 184 and the non-light-receiving side surfaces $112c2$ to $112c4$ of the light guide layer 112. In FIG. 1A, a gap G2 between the first facing portion 192 of the plastic frame 184 and the non-light-receiving side surface $112c4$ of the light guide layer 112 is illustrated. A gap (of approximately 0.6 mm, for example) is formed between the plastic frame 184 and the side surfaces $122c2$ to $122c4$ of the quantum dot phosphor layer 122. In FIG. 1A, a gap G3 between the second facing portion 194 of the plastic frame 184 and the side surface $122c4$ of the quantum dot phosphor layer 122 is illustrated. In the illustrated example, the liquid crystal display panel 50 is adhered to the plastic frame 184 via a tape (an adhesive layer) TPa. The plastic frame 184 is adhered to the holder 182 via a tape (an adhesive layer) TPb. A tape (an adhesive layer) TPc for fixing the second main surface $112b$ of the light guide layer 112 and the holder 182, and a tape (an adhesive layer) TPd for fixing the reflective layer 132 and the holder 182 may be further provided.

Figure 14:
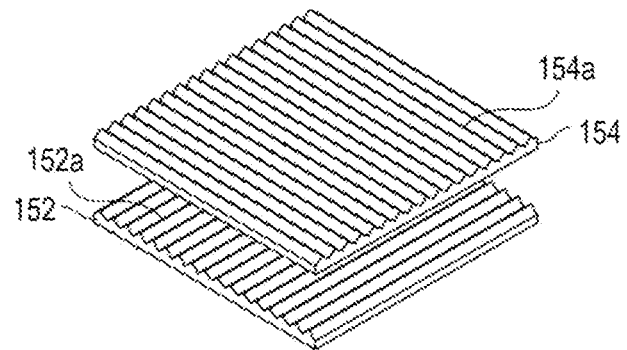
FIG. 14 is a schematic exploded view of an optical sheet layered body.

FIG. 14 is a schematic exploded view of an optical sheet layered body. The backlight apparatus 100A further includes an optical sheet layered body 150 provided on the side opposite to the light guide layer 112 with respect to the quantum dot phosphor layer 122. The optical sheet layered body 150 includes optical sheets 152 and 154. The optical sheet layered body 150 includes, for example, the prism sheets 152 and 154 arranged so that their respective ridge lines $152a$ and $154a$ are orthogonal to each other. As the prism sheets 152 and 154, for example, brightness enhancement film (BEF) manufactured by 3M can be used. In this example, a gap G1 (of approximately 0.07 mm, for example) is formed between the optical sheet layered body 150 and the liquid crystal display panel 50, that is, between the optical sheet (the prism sheet) 154 and the polarizer 32 on the back face 50r side of the liquid crystal display panel 50.

The backlight apparatus 200A provided with the liquid crystal display device 100A suppresses a deterioration in the display quality, and also realizes a reduction in thickness.

Effects obtained by the backlight apparatus of the present embodiment will be described in comparison with a backlight apparatus of a comparative example.

Figure 3:
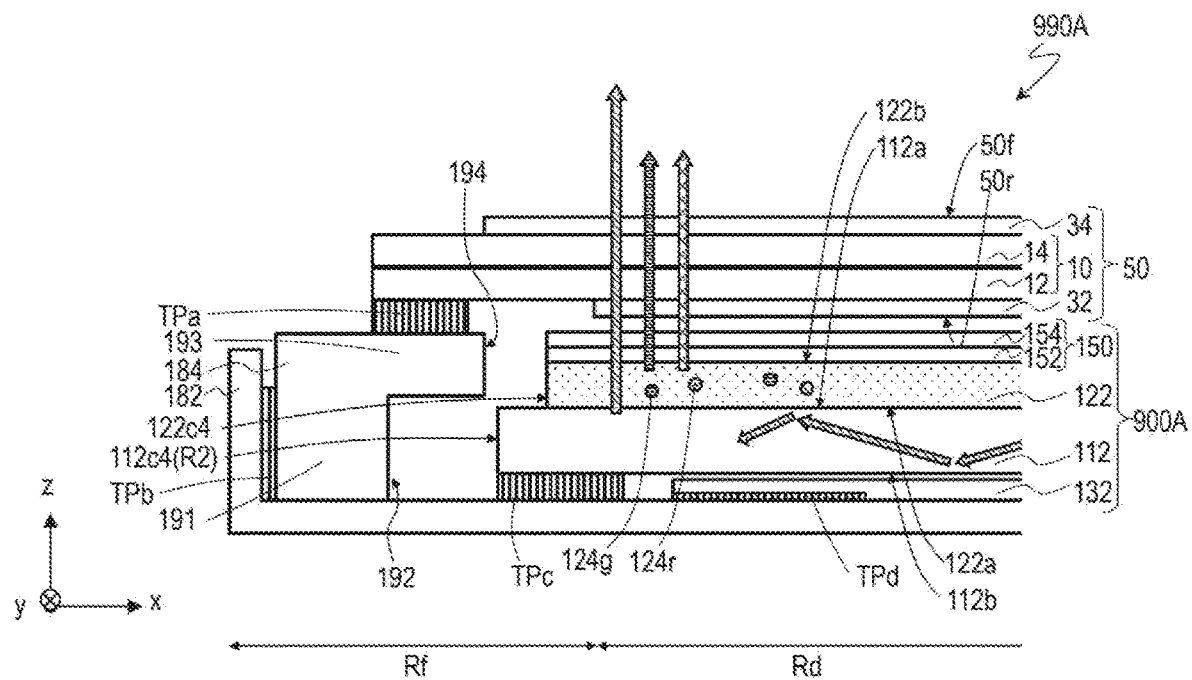
FIG. 3 is a schematic cross-sectional view of a liquid crystal display device 990A provided with a backlight apparatus 900A according to a first comparative example.
Figure 4:
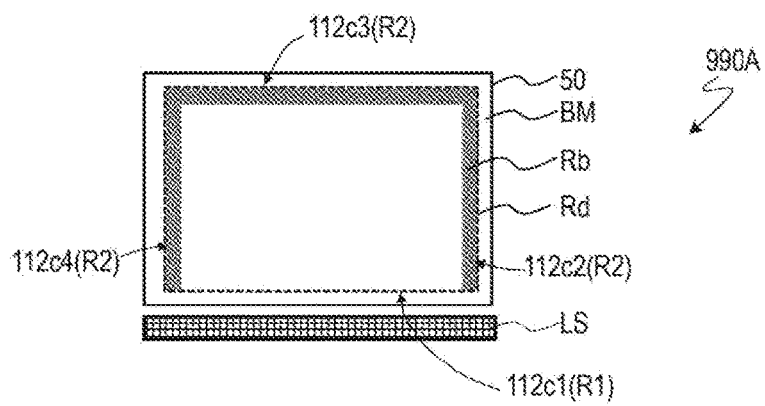
FIG. 4 is a schematic view for describing a problem occurring in the liquid crystal display device 990A according to the first comparative example.

FIG. 3 illustrates a schematic cross-sectional view of a liquid crystal display device 990A provided with a backlight apparatus 900A according to a first comparative example. FIG. 4 is a schematic view for describing a problem occurring in the liquid crystal display device 990A.

The backlight apparatus 900A according to the first comparative example differs from the backlight apparatus 100A according to the first embodiment in that the yellow phosphor layer 142 is not provided. In the liquid crystal display device 990A provided with the backlight apparatus 900A according to the first comparative example, in the display region Rd (a rectangular region surrounded by a dashed line in FIG. 4), display unevenness may occur in which a region (a hatched region Rb in FIG. 4) along three sides, excluding the long side on which the light source LS is arranged, is more blue and darker than other regions in the display region Rd. In the display region Rd, the region Rb is a region along the non-light-receiving side surfaces 112c2, 112c3, and 112c4 of the light guide layer 112. The region Rb may be referred to as the blue unevenness region Rb.

The brightness of the blue light emitted from the first main surface 112a (the light emitting surface) of the light guide layer 112 decreases as the distance from the light source LS increases. Furthermore, the blue light can be absorbed by the plastic frame 184 facing the non-light-receiving side surfaces 112c2 to 112c4 of the light guide layer 112. Thus, since the brightness of the green light emitted by the green quantum dot phosphor 124g and of the red light emitted by the red quantum dot phosphor 124r in response to the blue light is lower in the blue unevenness region Rb than in the other regions, display unevenness occurs in which, in the display region Rd, the blue unevenness region Rb appears to be more blue and darker than the other regions.

Furthermore, when the green light emitted by the green quantum dot phosphor 124g and the red light emitted by the red quantum dot phosphor 124r are absorbed by the plastic frame 184 facing the side surfaces of the quantum dot phosphor layer 122, the extent to which the blue unevenness region Rb appears to be more blue and darker may increase. Note that, even when the gap G3 is formed between the quantum dot phosphor layer 122 and the plastic frame 184, as in the illustrated example, the green light emitted by the green quantum dot phosphor 124g and the red light emitted by the red quantum dot phosphor 124r may be absorbed by the plastic frame 184 facing the side surfaces of the quantum dot phosphor layer 122.

Figure 5:
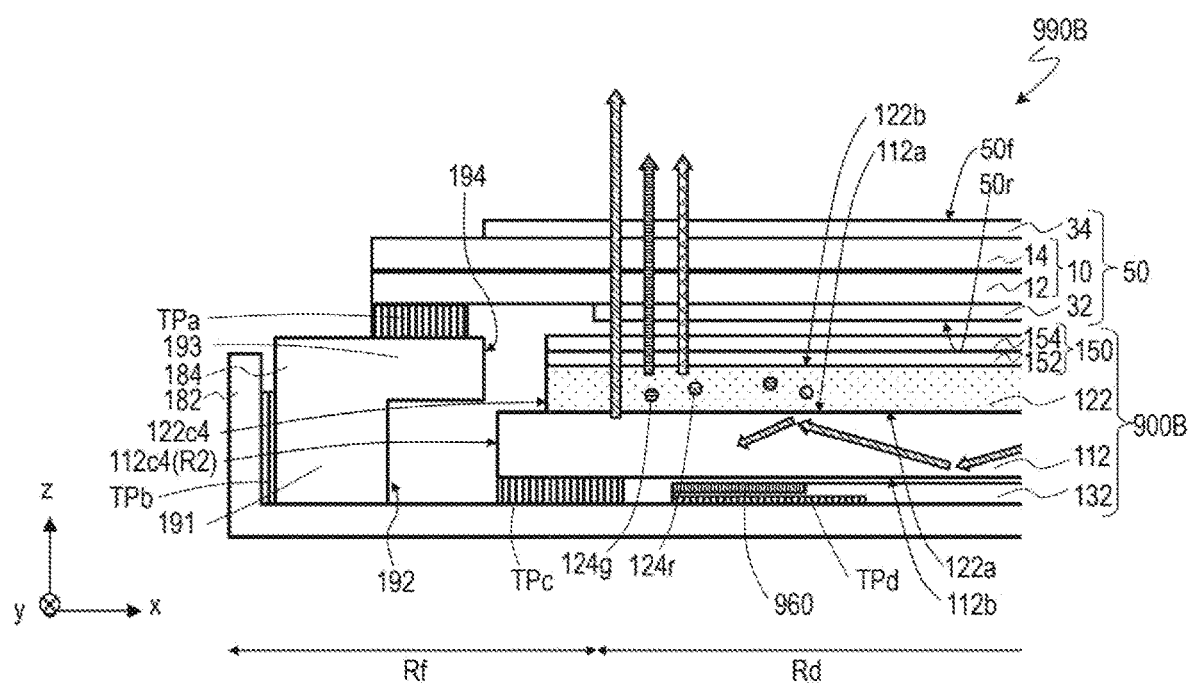
FIG. 5 is a schematic cross-sectional view of a liquid crystal display device 990B provided with a backlight apparatus 900B according to a second comparative example.

FIG. 5 illustrates a schematic cross-sectional view of a liquid crystal display device 990B provided with a backlight apparatus 900B according to a second comparative example.

The backlight apparatus 900B according to the second comparative example differs from the backlight apparatus 100A according to the first embodiment in that the backlight apparatus 900B includes a yellow coloring layer 960 instead of the yellow phosphor layer 142. The yellow coloring layer 960 contains a yellow pigment or dye and does not contain a yellow phosphor. In the liquid crystal display device 990B using the backlight apparatus 900B according to the second comparative example, the blue unevenness region Rb is prevented from being seen as being colored blue, but the blue unevenness region Rb being dark (having low brightness) is not improved.

The backlight apparatus disclosed in JP 2017-26705 A includes a colored layer containing a yellow pigment or dye, but the colored layer does not contain a yellow phosphor. In the backlight apparatus disclosed in JP 2017-26705 A, in a similar manner to the backlight apparatus 900B according to the second comparative example, the blue unevenness region Rb being darker (lower in brightness) than the other regions is not improved.

When the backlight apparatus 100A according to the first embodiment is used, the display quality of a display device is improved, as compared with the backlight apparatuses according to the first and second comparative examples. The backlight apparatus 100A according to the first embodiment includes the yellow phosphor layer 142 provided at the blue unevenness region Rb. Since the yellow phosphor contained in the yellow phosphor layer 142 receives the blue light and emits the yellow light, the blue unevenness region Rb is suppressed from being colored blue and from appearing dark.

In the backlight apparatus 100A, the quantum dot phosphor layer 122 is in contact with the first main surface 112a of the light guide layer 112. Since no gap is formed between the quantum dot phosphor layer 122 and the light guide layer 112 in the backlight apparatus 100A, the backlight apparatus 100A can reduce the thickness of the display device.

Second Embodiment

Figure 6:
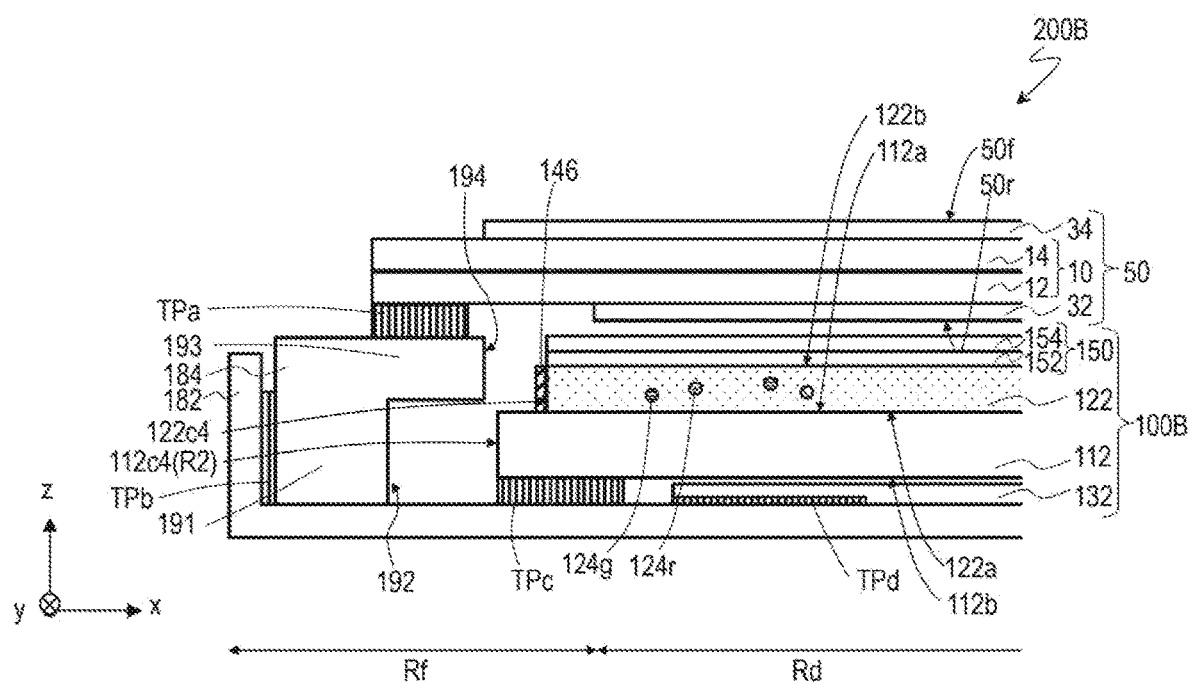
FIG. 6 is a schematic cross-sectional view of a liquid crystal display device 200C provided with a backlight apparatus 100B according to a second embodiment of the disclosure.

A liquid crystal display device 200B provided with a backlight apparatus 100B according to the present embodiment will be described with reference to FIG. 6.

The liquid crystal display device 200B differs from the liquid crystal display device 200A according to the first embodiment provided with the backlight apparatus 100A in that the liquid crystal display device 200B is provided with the backlight apparatus 100B. The backlight apparatus 100B includes a yellow phosphor layer 146 instead of the yellow phosphor layer 142 included in the backlight apparatus 100A. The yellow phosphor layer 146 is provided so as to face, of the four side surfaces 122c1 to 122c4 of the quantum dot phosphor layer 122, the side surfaces 122c2 to 122c4 that are substantially parallel to the non-light-receiving side surfaces 112c2 to 112c4 of the light guide layer 112. The yellow phosphor layer 146 contains a yellow phosphor that receives the blue light emitted from the light source LS and emits yellow light. In this example, the yellow phosphor layer 146 is provided on the side surfaces 122c2 to 122c4 of the quantum dot phosphor layer 122. In other words, the yellow phosphor layer 146 is in contact with the side surfaces 122c2 to 122c4 of the quantum dot phosphor layer 122. The yellow phosphor layer 146 is not limited to this example, and may be provided on the second facing portion 194 of the plastic frame 184 that faces the side surfaces 122c2 to 122c4 of the quantum dot phosphor layer 122. The four side surfaces 122c1 to 122c4 of the quantum dot phosphor layer 122 may or may not be respectively aligned with the side surfaces 112c1 to 112c4 of the light guide layer 112. The side surfaces of the quantum dot phosphor layer 122 and the side surfaces of the light guide layer 112 being aligned with each other means being substantially flush with each other.

By using the backlight apparatus 100B also, the deterioration in the display quality of the display device is suppressed, in a similar manner as with the backlight apparatus 100A.

In the backlight apparatus 100B, the quantum dot phosphor layer 122 is in contact with the first main surface 112a of the light guide layer 112. Thus, in the backlight apparatus 100B, in a similar manner as with the backlight apparatus 100A, the thickness of the display device can be reduced. Note that a gap may be formed between the quantum dot phosphor layer 122 and the light guide layer 112, and also when the gap is formed between the quantum dot phosphor layer 122 and the light guide layer 112, the effect can be obtained of suppressing the blue unevenness region Rb from being colored blue and from appearing dark.

Figure 7:
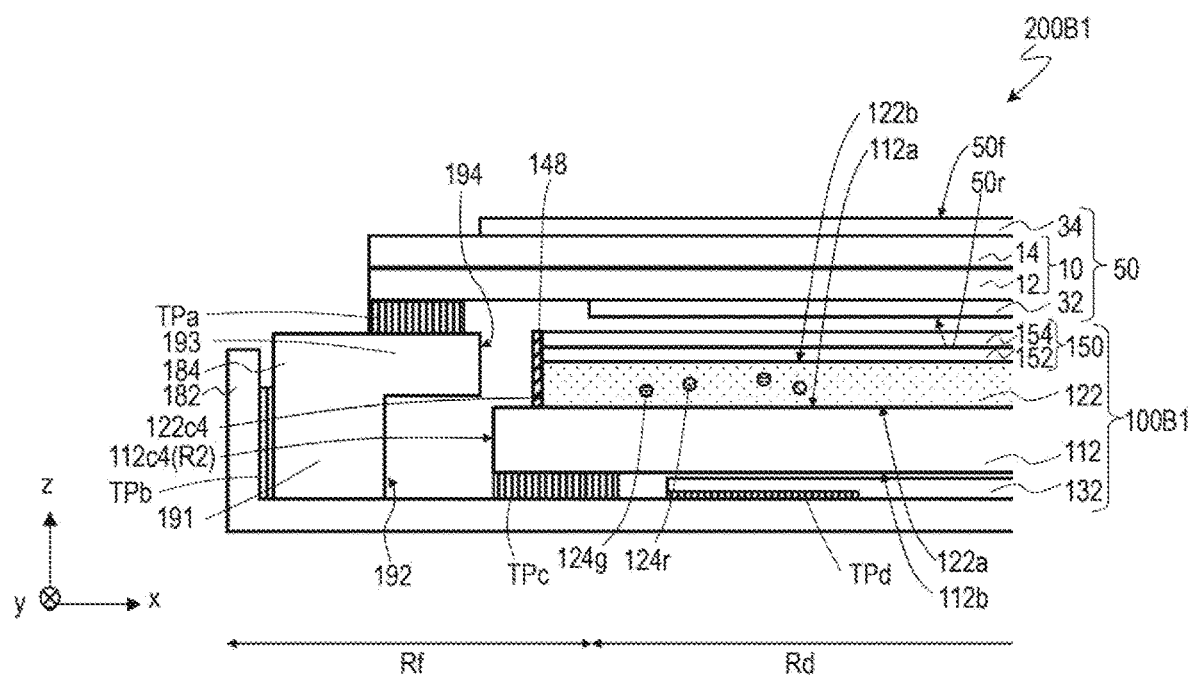
FIG. 7 is a schematic cross-sectional view of a liquid crystal display device 200C1 provided with a backlight apparatus 100B1 according to a modified example of the second embodiment of the disclosure.

A liquid crystal display device 200B1 provided with a backlight apparatus 100B1 according to a modified example of the present embodiment will be described with reference to FIG. 7.

A yellow phosphor layer 148 included in the backlight apparatus 100B1 differs from the yellow phosphor layer 146 of the backlight apparatus 100B in that the yellow phosphor layer 148 is provided so as to face the side surfaces of the quantum dot phosphor layer 122, and is provided so as to face, of the four side surfaces of the optical sheet (the prism sheet) 152, the three side surfaces that are substantially parallel to the non-light-receiving side surfaces 112c2 to 112c4 of the light guide layer 112. Furthermore, the yellow phosphor layer 148 is provided so as to face, of the four side surfaces of the optical sheet (the prism sheet) 154, the three side surfaces that are substantially parallel to the non-light-receiving side surfaces 112c2 to 112c4 of the light guide layer 112. In this example, the yellow phosphor layer 148 is provided on the side surfaces 122c2 to 122c4 of the quantum dot phosphor layer 122, on the three side surfaces, of the four side surfaces of the optical sheet 152, that are substantially parallel to the non-light-receiving side surfaces 112c2 to 112c4 of the light guide layer 112, and on the three side surfaces, of the four side surfaces of the optical sheet 154, that are substantially parallel to the non-light-receiving side surfaces 112c2 to 112c4 of the light guide layer 112. In other words, the yellow phosphor layer 148 is in contact with the side surfaces 122c2 to 122c4 of the quantum dot phosphor layer 122, the above-described three side surfaces of the optical sheet 152, and the above-described three side surfaces of the optical sheet 154. The yellow phosphor layer 148 is not limited to this example, and may be provided on the second facing portion 194 of the plastic frame 184 that faces the side surfaces 122c2 to 122c4 of the quantum dot phosphor layer 122. The yellow phosphor layer 148 may be provided so as to face only the side surfaces of the quantum dot phosphor layer 122 and the side surfaces of optical sheet 152, and may not have a portion facing the side surfaces of optical sheet 154. The side surfaces of the prism sheets 152 and 154 are preferably aligned with (substantially flush with) the side surfaces of the quantum dot phosphor layer 122.

By using the backlight apparatus 100B1 also, the deterioration in the display quality of the display device is suppressed, in a similar manner as with the backlight apparatus 100A.

In the backlight apparatus 100B1 also, the quantum dot phosphor layer 122 is in contact with the first main surface 112a of the light guide layer 112. Thus, in the backlight apparatus 100B1, in a similar manner as with the backlight apparatus 100A, the thickness of the display device can be reduced.

Third Embodiment

Figure 8:
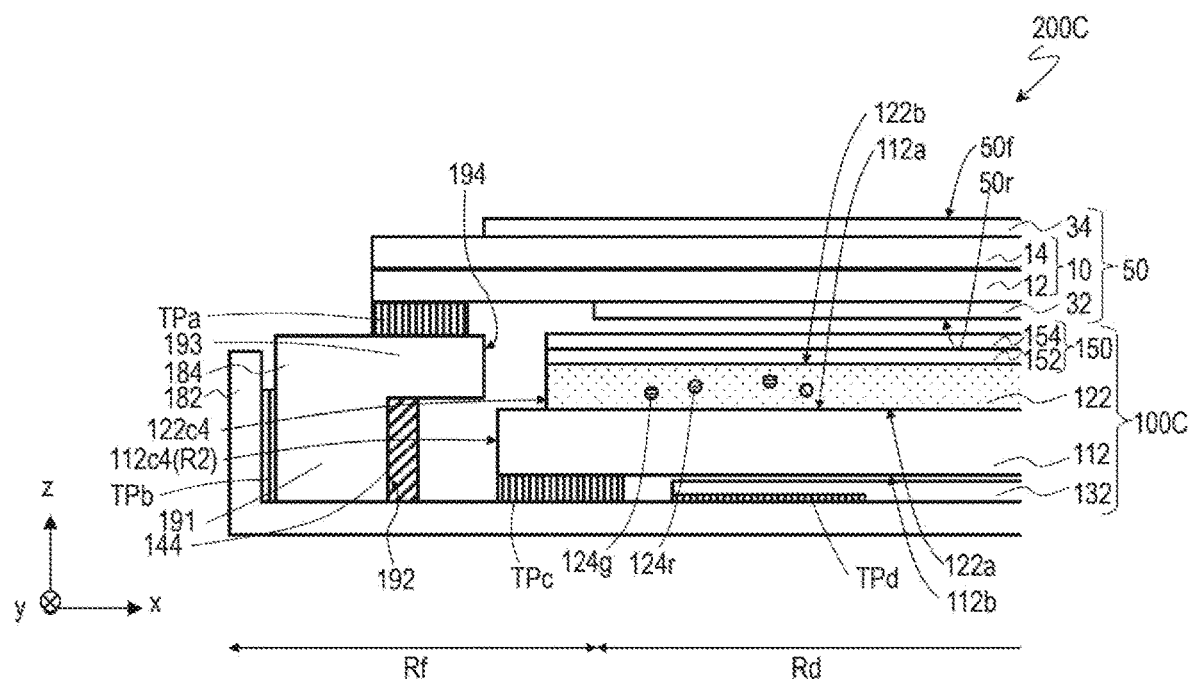
FIG. 8 is a schematic cross-sectional view of a liquid crystal display device 200B provided with a backlight apparatus 100C according to a third embodiment of the disclosure.

A liquid crystal display device 200C provided with a backlight apparatus 100C according to the present embodiment will be described with reference to FIG. 8.

The liquid crystal display device 200C differs from the liquid crystal display device 200A according to the first embodiment provided with the backlight apparatus 100A in that the liquid crystal display device 200C is provided with the backlight apparatus 100C. The backlight apparatus 100C includes a yellow phosphor layer 144 instead of the yellow phosphor layer 142 included in the backlight apparatus 100A. The yellow phosphor layer 144 is provided so as to face the non-light-receiving side surfaces 112c2 to 112c4 of the light guide layer 112. The yellow phosphor layer 144 contains a yellow phosphor that receives the blue light emitted from the light source LS and emits yellow light. In this example, the yellow phosphor layer 144 is provided on the first facing portion 192 of the plastic frame 184. The yellow phosphor layer 144 and the light guide layer 112 are not in contact with each other. A gap is formed between the yellow phosphor layer 144 and the non-light-receiving side surface 112c4 of the light guide layer 112.

By using the backlight apparatus 100C also, the deterioration in the display quality of the display device is suppressed, in a similar manner as with the backlight apparatus 100A.

In the backlight apparatus 100C, the quantum dot phosphor layer 122 is in contact with light guide layer 112, and no gap is formed between the quantum dot phosphor layer 122 and the light guide layer 112. Thus, the backlight apparatus 100C can reduce the thickness of the display device, compared to the backlight apparatus disclosed in WO 2016/143765. In the backlight apparatus disclosed in WO 2016/143765, since a gap is provided between a wavelength conversion layer and a light guide layer, the backlight apparatus cannot be made sufficiently thin.

Evaluation Results of Color Unevenness

Effects obtained by the backlight apparatus according to the embodiment of the disclosure were investigated by evaluating a degree of color unevenness using a sample panel.

Figure 9:
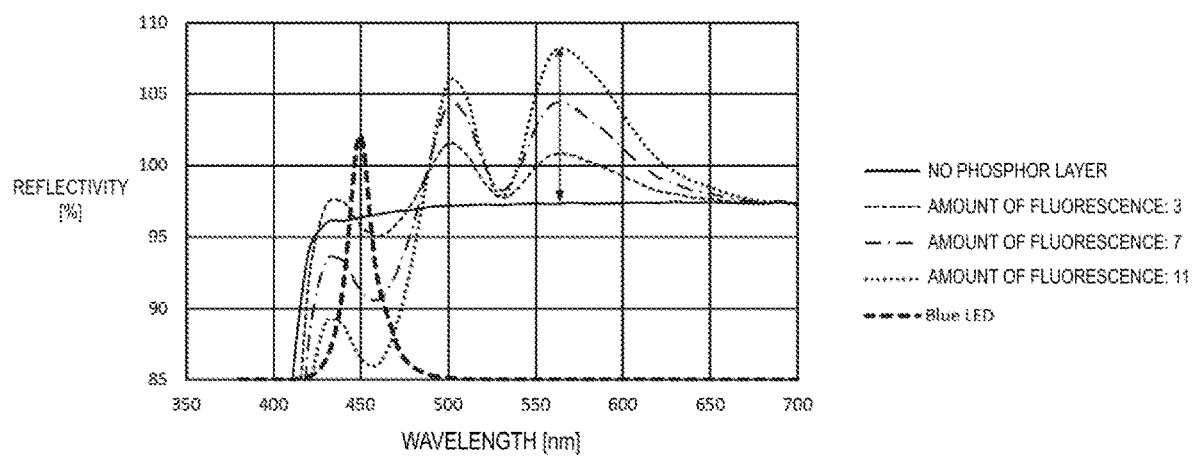
FIG. 9 is a diagram illustrating a light emission spectrum of a yellow phosphor used in a sample panel for evaluating color unevenness.

A sample panel A having the same structure as that of the backlight apparatus 100A was obtained by forming the yellow phosphor layer 142, as illustrated in FIG. 2C, by applying (or printing) yellow phosphor ink (fluorescence amount of 3) to the region having the width W1 along the three sides, of the four sides of the outer periphery of the reflective layer 132, excluding the long side on which the light source LS is disposed. The sample panel A has a size corresponding to a 13.3 inch (13.3 inches) liquid crystal display panel. The value of the "amount of fluorescence" was defined as follows. The total light reflectivity of the reflective layer having the yellow phosphor layer formed on the surface thereof is measured, thus obtaining a graph as illustrated in FIG. 9, in which the horizontal axis represents the wavelength and the vertical axis represents the total light reflectivity. The total light reflectivity was measured using a spectrophotometer (CM-3700d, manufactured by KONICA MINOLTA, INC.). In FIG. 9, values are indicated where the total light reflectivity of a reference sample is 100%. The same measurement is performed for the reflective layer on which the yellow phosphor layer is not formed on the surface thereof ("NO PHOSPHOR LAYER" in FIG. 9). The difference between the highest value (%) of the total light reflectivity of the reflective layer on which the yellow phosphor layer is formed (the value at a wavelength in the vicinity of 570 nm in the illustrated example) and the total light reflectivity (%), at that wavelength, of the reflective layer on which the yellow phosphor layer is not printed is used as the "amount of fluorescence". For example, since the difference in the total light reflectivity at a section indicated by an arrow (wavelength of 570 nm) in FIG. 9 is 108%–97%=11%, the amount of fluorescence at this time is 11. Note that the light emission spectrum of the light source LS (the blue LED) ("BLUE LED" in FIG. 9) is also illustrated in FIG. 9.

The color unevenness in the blue unevenness region Rb was visually evaluated while changing the width W1 and the amount of fluorescence of the yellow phosphor layer 142 of the sample panel A. The light emission spectrum of the yellow phosphor layer 142 is illustrated in FIG. 9, and the results of the visual evaluation are shown in FIG. 10. As shown in FIG. 10, the degree of color unevenness was evaluated using 11 levels, from −5 to 5. The smaller the numerical value, the more blue the color looks, and the larger the numerical value, the more yellow the color looks. A range from −2 to 2 was evaluated as being OK (color unevenness was suppressed). In the left-side table in FIG. 10, the range of the OK evaluation is surrounded by a thick-lined frame. It can be seen that the width W1 of the yellow phosphor layer 142 is preferably equal to or less than 5 mm. Note that, since the range in which the color unevenness occurs may vary depending on the size and structure of the display panel, the preferable range of the width W1 of the yellow phosphor layer 142 is not limited to the above range and may be changed.

Figure 11A:
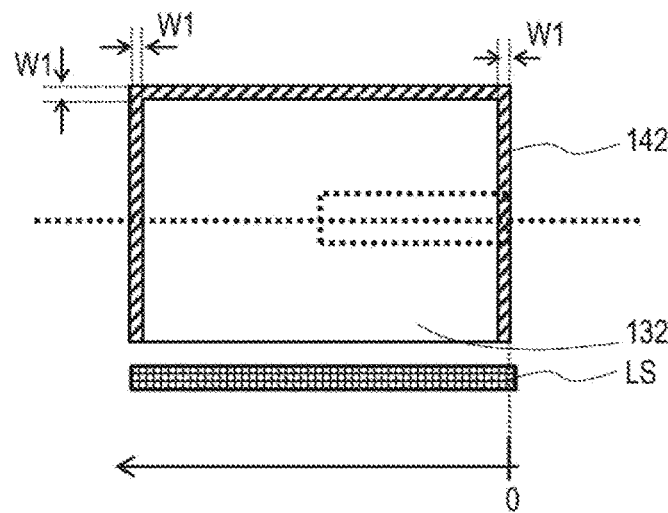
FIG. 11A is a schematic view for describing a color unevenness evaluation method.

Furthermore, quantitative evaluation of the degree of color unevenness was examined. A description will be made with reference to FIG. 11A, FIG. 11B and FIG. 12.

A line in a direction parallel to the long side of the sample panel A (a dashed line in FIG. 11A) was drawn so as to pass through the center thereof in the short-side direction, and chromaticity on the line was measured using a 2D color analyzer (CA2500, manufactured by KONICA MINOLTA, INC.). The measurement results were represented by a graph in which the x-axis represents a distance (mm) from the edge of the panel and the y-axis represents a chromaticity y, for example, as in the graph in FIG. 11B. From the graph, a blue area and a yellow area were estimated as follows.

Blue area: area of a section in which the chromaticity y dips in a minus direction in comparison with a panel center portion.

Yellow area: area of a section in which the chromaticity y is raised by the yellow phosphor layer.

Figure 11B:
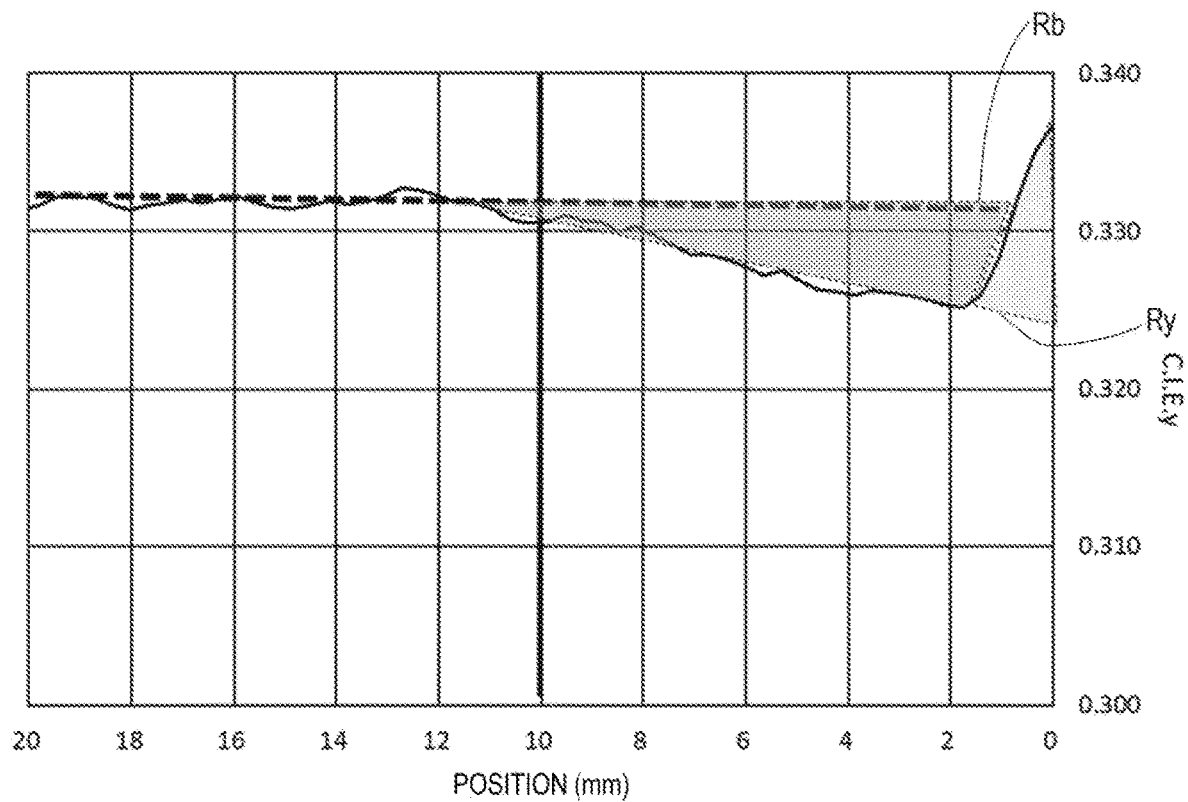
FIG. 11B is a schematic diagram for describing the color unevenness evaluation method.
Figure 12:
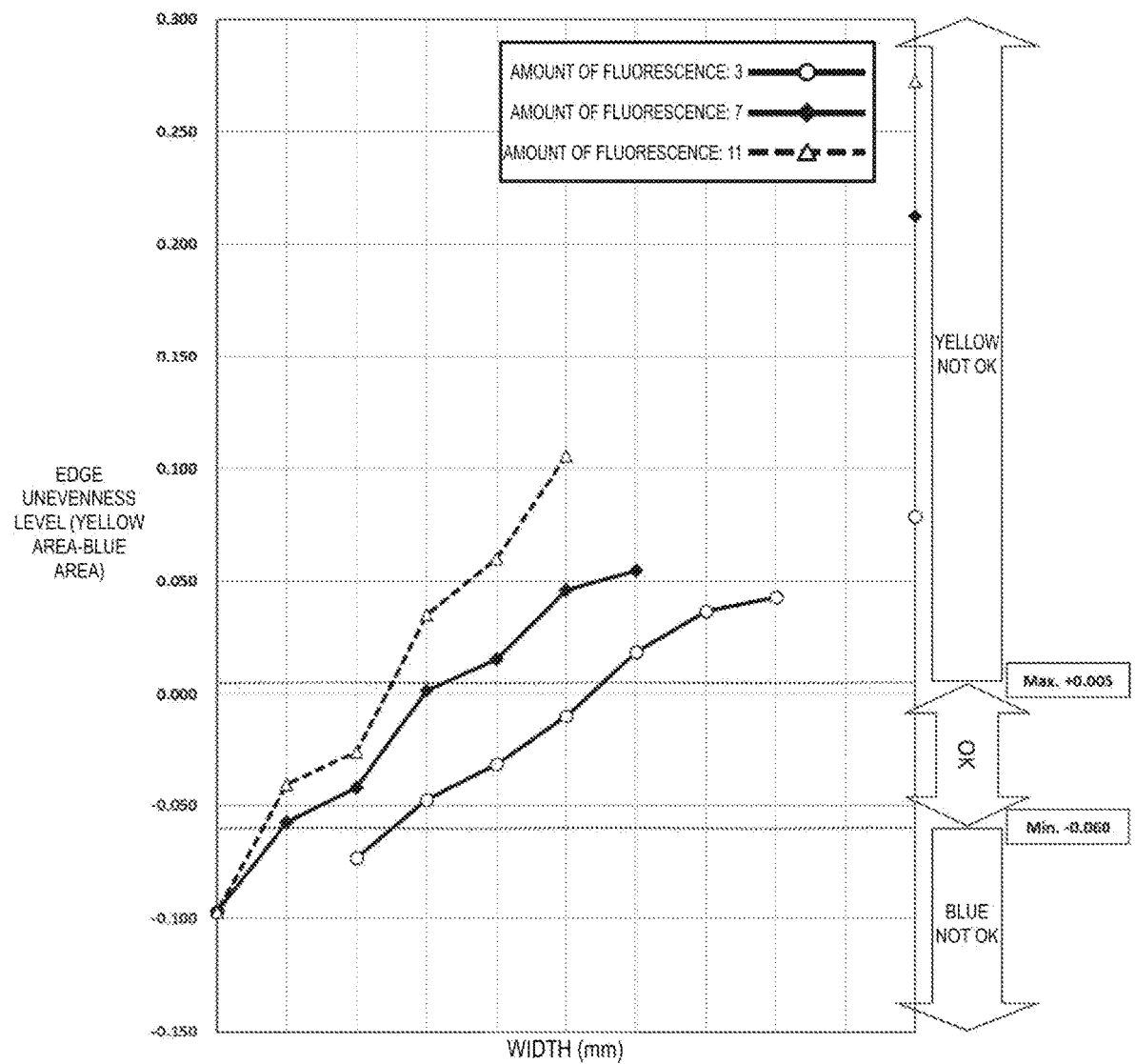
FIG. 12 is a graph showing results of the color unevenness evaluation of the sample panel A.

FIG. 11B illustrates an example of a graph in a case in which a fluorescence amount of the yellow phosphor layer is 11, and the width W1 is 2 mm. In FIG. 11B, regions Rb and Ry for estimating the blue area and the yellow area, respectively, are also illustrated. The degree of color unevenness was represented by a difference between the yellow area and the blue area (yellow area-blue area). The smaller the difference between the yellow area and the blue area (yellow area-blue area), the more blue the color looks, and the larger the difference, the more yellow the color looks. When the value of the difference between the yellow area and the blue area (yellow area-blue area) was in a range from −0.060 to 0.005, it could be expressed that the color unevenness is suppressed.

Figure 13:
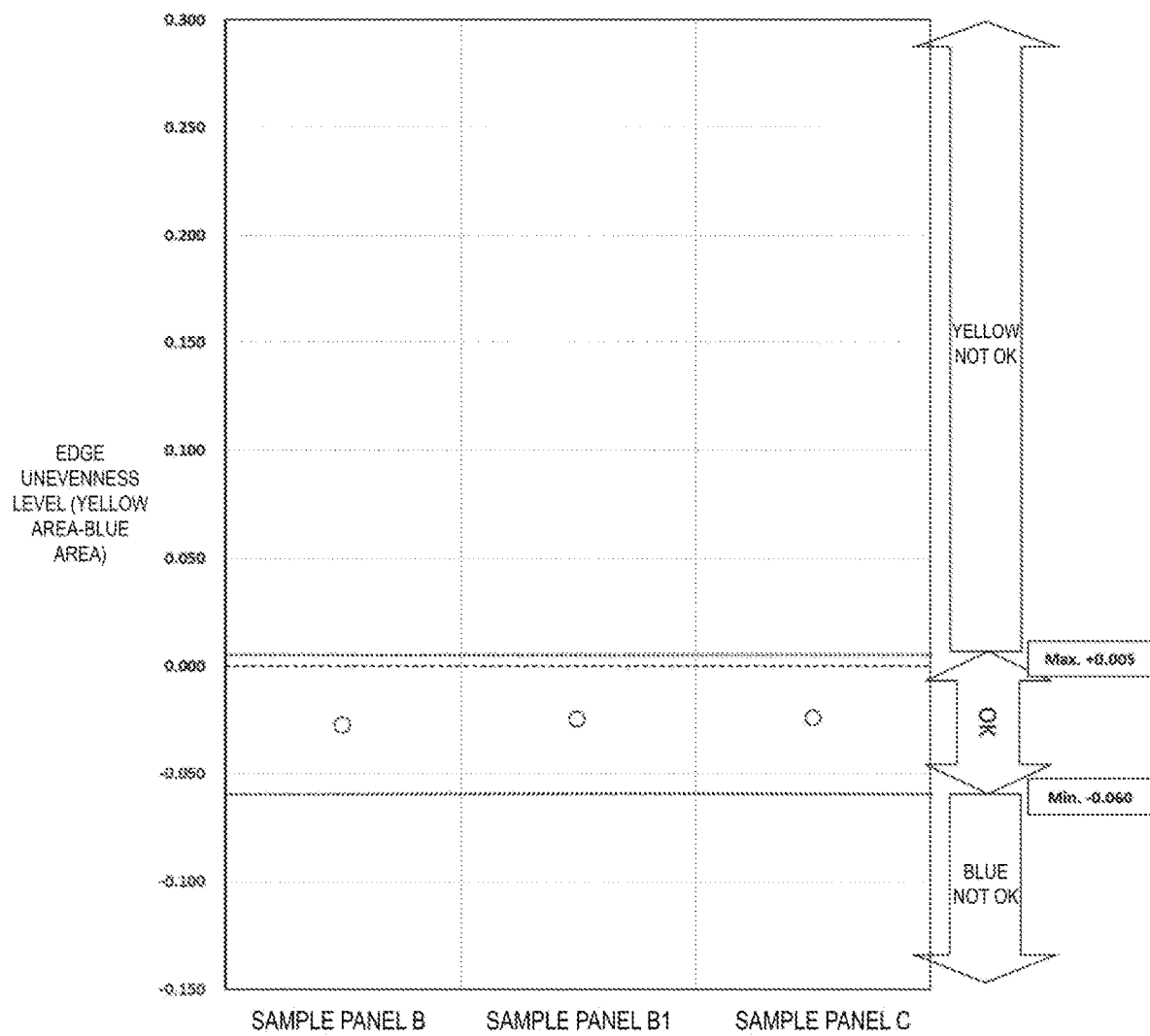
FIG. 13 is a graph showing results of color unevenness evaluations of a sample panel B, a sample panel B1, and a sample panel C.

A sample panel B, a sample panel B1, and a sample panel C respectively corresponding to the backlight apparatuses 100B, 100B1, and 100C were prepared in the same manner, and evaluated for color unevenness. Here, a yellow phosphor layer having a fluorescence amount of 18 was used. The results are shown in FIG. 13. In all of the sample panel B, the sample panel B1, and the sample panel C, the color unevenness was suppressed. As shown in FIG. 13, it was found that the value of the difference between the yellow area and the blue area (yellow area-blue area) was in the range from −0.060 to 0.005 in each of the sample panel B, the sample panel B1, and the sample panel C.

The backlight apparatus according to the embodiments of the disclosure can improve performance, including the display quality and/or the reduction in thickness, of the display device.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A backlight apparatus comprising:
   a light source configured to emit blue light;
   a light guide layer including a first main surface, a second main surface on a side opposite to the first main surface, at least one light-receiving side surface intersecting the first and second main surfaces and receiving the blue light emitted from the light source, and at least one non-light-receiving side surface intersecting the first and second main surfaces and not receiving the blue light;
   a quantum dot phosphor layer provided on the first main surface side of the light guide layer, the quantum dot phosphor layer including a red quantum dot phosphor receiving the blue light and emitting red light and a green quantum dot phosphor receiving the blue light and emitting green light;
   a reflective layer disposed on the second main surface side of the light guide layer; and
   a yellow phosphor layer provided between the second main surface of the light guide layer and the reflective layer and in a region along the at least one non-light-receiving side surface when viewed from a normal direction of the first main surface, the yellow phosphor layer including a yellow phosphor receiving the blue light and emitting yellow light,
   wherein the quantum dot phosphor layer is in contact with the first main surface of the light guide layer.

2. The backlight apparatus according to claim 1, wherein, when the yellow phosphor layer is viewed from the normal direction of the first main surface, a width of the region is equal to or less than 5 mm.

3. The backlight apparatus according to claim 1, wherein the yellow phosphor layer is in contact with a main surface of the reflective layer on the light guide layer side.

4. The backlight apparatus according to claim 1, wherein a gap is formed between the yellow phosphor layer and the second main surface of the light guide layer.

5. A backlight apparatus comprising:
   a light source configured to emit blue light;
   a light guide layer including a first main surface, a second main surface on a side opposite to the first main surface, at least one light-receiving side surface intersecting the first and second main surfaces and receiving the blue light emitted from the light source, and at least one non-light-receiving side surface intersecting the first and second main surfaces and not receiving the blue light;

a quantum dot phosphor layer provided on the first main surface side of the light guide layer, the quantum dot phosphor layer including a third main surface facing the first main surface, a fourth main surface on a side opposite to the third main surface, at least one first side surface substantially parallel to the at least one light-receiving side surface, and at least one second side surface substantially parallel to the at least one non-light-receiving side surface, and the quantum dot phosphor layer including a red quantum dot phosphor receiving the blue light and emitting red light and a green quantum dot phosphor receiving the blue light and emitting green light;

a reflective layer disposed on the second main surface side of the light guide layer; and a yellow phosphor layer provided facing the at least one second side surface of the quantum dot phosphor layer, the yellow phosphor layer including a yellow phosphor receiving the blue light and emitting yellow light.

6. The backlight apparatus according to claim 5, wherein the yellow phosphor layer is in contact with the at least one second side surface of the quantum dot phosphor layer.

7. The backlight apparatus according to claim 5, further comprising
an optical sheet provided on a side opposite to the light guide layer with respect to the quantum dot phosphor layer,
wherein the optical sheet includes a fifth main surface on the quantum dot phosphor layer side, a sixth main surface on a side opposite to the fifth main surface, at least one third side surface substantially parallel to the at least one light-receiving side surface, and at least one fourth side surface substantially parallel to the at least one non-light-receiving side surface, and
the yellow phosphor layer is provided facing the at least one second side surface of the quantum dot phosphor layer and the at least one fourth side surface of the optical sheet.

8. The backlight apparatus according to claim 7, wherein the yellow phosphor layer is in contact with the at least one second side surface of the quantum dot phosphor layer and the at least one fourth side surface of the optical sheet.

9. The backlight apparatus according to claim 7, further comprising
an other optical sheet provided on a side opposite to the quantum dot phosphor layer with respect to the optical sheet,
wherein the other optical sheet includes a seventh main surface on the optical sheet side, an eighth main surface on a side opposite to the seventh main surface, at least one fifth side surface substantially parallel to the at least one light-receiving side surface, and at least one sixth side surface substantially parallel to the at least one non-light-receiving side surface, and the yellow phosphor layer is provided facing the at least one second side surface of the quantum dot phosphor layer, the at least one fourth side surface of the optical sheet, and the at least one sixth side surface of the other optical sheet.

10. The backlight apparatus according to claim 9, wherein the yellow phosphor layer is in contact with the at least one second side surface of the quantum dot phosphor layer, the at least one fourth side surface of the optical sheet, and the at least one sixth side surface of the other optical sheet.

11. The backlight apparatus according to claim 9, wherein the optical sheet and the other optical sheet are prism sheets arranged in a manner such that respective ridge lines are orthogonal to each other.

12. The backlight apparatus according to claim 5, wherein the third main surface of the quantum dot phosphor layer is in contact with the first main surface of the light guide layer.

13. A backlight apparatus comprising:
a light source configured to emit blue light;
a light guide layer including a first main surface, a second main surface on a side opposite to the first main surface, at least one light-receiving side surface intersecting the first and second main surfaces and receiving the blue light emitted from the light source, and at least one non-light-receiving side surface intersecting the first and second main surfaces and not receiving the blue light;

a quantum dot phosphor layer provided on the first main surface side of the light guide layer, the quantum dot phosphor layer including a third main surface facing the first main surface, a fourth main surface on a side opposite to the third main surface, and a side surface intersecting the third and fourth main surfaces, and the quantum dot phosphor layer including a red quantum dot phosphor receiving the blue light and emitting red light and a green quantum dot phosphor receiving the blue light and emitting green light;

a reflective layer disposed on the second main surface side of the light guide layer; and a yellow phosphor layer provided facing the at least one non-light-receiving side surface of the light guide layer, the yellow phosphor layer including a yellow phosphor receiving the blue light and emitting yellow light, wherein the third main surface of the quantum dot phosphor layer is in contact with the first main surface of the light guide layer.

14. The backlight apparatus according to claim 13, further comprising
a plastic frame surrounding the light guide layer,
wherein the plastic frame includes a first facing portion facing the at least one non-light-receiving side surface of the light guide layer, and
the yellow phosphor layer is provided on the first facing portion.

15. The backlight apparatus according to claim 13, wherein a gap is formed between the yellow phosphor layer and the at least one non-light-receiving side surface of the light guide layer.

* * * * *